US007905775B2

(12) United States Patent
Walker et al.

(10) Patent No.: US 7,905,775 B2
(45) **Date of Patent: *Mar. 15, 2011**

(54) METHODS AND APPARATUS FOR OPERATING A GAMING DEVICE

(75) Inventors: Jay S. Walker, Ridgefield, CT (US); James A. Jorasch, New York, NY (US); Magdalena M. Fincham, Ridgefield, CT (US); Stephen C. Tulley, Fairfield, CT (US)

(73) Assignee: IGT, Reno, NV (US)

( * ) Notice: Subject to any disclaimer, the term of this patent is extended or adjusted under 35 U.S.C. 154(b) by 1195 days.

This patent is subject to a terminal disclaimer.

(21) Appl. No.: 10/908,725

(22) Filed: May 24, 2005

(65) Prior Publication Data

US 2005/0197183 A1 Sep. 8, 2005

Related U.S. Application Data

(63) Continuation-in-part of application No. 10/829,420, filed on Apr. 21, 2004, now Pat. No. 6,932,704.

(60) Provisional application No. 60/581,560, filed on Jun. 21, 2004.

(51) Int. Cl.
*A63F 13/00* (2006.01)
*A63F 1/00* (2006.01)
*A63F 13/10* (2006.01)
*A63F 1/18* (2006.01)

(52) U.S. Cl. ................ 463/25; 463/16; 463/20; 463/27; 463/30; 463/43; 273/138.1; 273/148 R

(58) Field of Classification Search ........................ None
See application file for complete search history.

(56) References Cited

U.S. PATENT DOCUMENTS 4,492,378 A * 1/1985 Williams ............... 273/142 HA
4,636,951 A 1/1987 Harlick ......................... 364/412
4,764,666 A 8/1988 Bergeron
4,815,741 A 3/1989 Small
4,837,728 A 6/1989 Barrie et al.
4,882,473 A 11/1989 Bergeron et al.
5,038,022 A 8/1991 Lucero
5,159,549 A 10/1992 Hallman, Jr. et al.
5,179,517 A 1/1993 Sarbin et al. .................. 364/410
(Continued)

FOREIGN PATENT DOCUMENTS

GB 2096376 10/1982
(Continued)

OTHER PUBLICATIONS

Website: "Golden Palace Casino", (http www inspace net/~ragoczy/gambling/goldenpalace htm), download date: Mar. 16, 1998, 3pp.

(Continued)

*Primary Examiner* — Dmitry Suhol
*Assistant Examiner* — Matthew Russell
(74) *Attorney, Agent, or Firm* — K&L Gates LLP

(57) ABSTRACT

According to one or more embodiments, a gaming device, comprises a processor, a wagering game controlled by the processor, and an input device that allows a player of the gaming device to request an amount be dispensed from a balance of the gaming device, the amount being less than an entirety of the balance, wherein the balance comprises a balance available for wagering at the gaming device.

7 Claims, 15 Drawing Sheets

U.S. PATENT DOCUMENTS 5,275,400 A 1/1994 Weingardt et al. ........ 273/85 CP
5,332,076 A 7/1994 Ziegert
5,342,047 A 8/1994 Heidel et al.
5,371,345 A 12/1994 LeStrange et al.
5,377,973 A 1/1995 Jones et al. ............... 273/85 CP
5,397,125 A 3/1995 Adams
5,429,361 A * 7/1995 Raven et al. .................... 463/25
5,470,079 A * 11/1995 LeStrange et al. .............. 463/25
5,511,781 A 4/1996 Wood et al. ............... 273/85 CP
5,546,523 A 8/1996 Gatto
5,559,312 A 9/1996 Lucero .......................... 235/380
5,575,717 A 11/1996 Houriet, Jr. et al.
5,639,088 A 6/1997 Schneider et al. ......... 273/138.2
5,655,961 A * 8/1997 Acres et al. ..................... 463/27
5,674,128 A 10/1997 Holch et al. .................... 463/42
5,752,239 A 5/1998 Coutts
5,766,074 A 6/1998 Cannon et al.
5,770,533 A 6/1998 Franchi ........................... 463/42
5,779,546 A * 7/1998 Meissner et al. ................ 463/25
5,816,918 A 10/1998 Kelly et al.
5,919,091 A 7/1999 Bell et al. ........................ 463/25
5,951,397 A 9/1999 Dickinson
5,984,779 A 11/1999 Bridgeman et al.
5,993,316 A 11/1999 Coyle et al.
6,012,832 A * 1/2000 Saunders et al. .............. 235/375
6,014,594 A 1/2000 Heidel et al.
6,015,344 A 1/2000 Kelly et al.
6,048,269 A * 4/2000 Burns et al. ..................... 463/25
6,056,642 A 5/2000 Bennett
6,068,552 A 5/2000 Walker et al.
6,110,041 A 8/2000 Walker et al.
6,110,044 A 8/2000 Stern
6,113,098 A 9/2000 Adams
6,125,307 A 9/2000 Heidel et al.
6,126,166 A * 10/2000 Lorson et al. ............. 273/148 R
6,128,550 A 10/2000 Heidel et al.
6,139,419 A 10/2000 Abe
6,168,522 B1 1/2001 Walker et al. ................... 463/25
6,266,647 B1 7/2001 Fernandez
6,290,600 B1 9/2001 Glasson
6,293,866 B1 9/2001 Walker et al.
6,332,099 B1 12/2001 Heidel et al.
6,375,187 B1 4/2002 Baerlocher
6,450,887 B1 9/2002 Mir et al.
6,500,067 B1 12/2002 Luciano et al.
6,500,068 B2 12/2002 Walker et al.
6,506,118 B1 1/2003 Baerlocher et al.
6,511,377 B1 1/2003 Weiss .............................. 463/25
6,530,842 B1 3/2003 Wells et al.
6,537,151 B1 3/2003 Walker et al. ................... 463/25
6,558,255 B2 5/2003 Walker et al.
6,558,256 B1 5/2003 Saunders
6,579,179 B2 6/2003 Poole et al.
6,582,301 B2 * 6/2003 Hill ................................ 463/11
6,599,192 B1 7/2003 Baerlocher et al.
6,609,978 B1 8/2003 Paulsen
6,620,047 B1 9/2003 Alcorn et al.
6,623,357 B2 9/2003 Chowdhury
6,626,757 B2 * 9/2003 Oliveras .......................... 463/13
6,648,754 B2 11/2003 Baerlocher et al.
6,743,097 B2 6/2004 Walker et al. ................... 463/25
6,752,312 B1 6/2004 Chamberlain et al.
7,147,558 B2 12/2006 Giobbi
7,261,635 B2 * 8/2007 Walker et al. ................... 463/25
2002/0173352 A1 * 11/2002 Oliveras .......................... 463/13
2002/0177479 A1 11/2002 Walker et al.
2003/0092477 A1 5/2003 Luciano, Jr. et al.
2003/0199320 A1 10/2003 Nguyen et al.
2003/0209599 A1 11/2003 Gatto
2005/0079908 A1 4/2005 Pacey

FOREIGN PATENT DOCUMENTS

GB 2142457 1/1985
GB 2 161 008 A 1/1986
GB 2161008 1/1986
GB 2161009 1/1986
GB 2180682 4/1987
GB 2181589 4/1987
GB 2183882 6/1987
GB 2222712 3/1990
WO 8500910 2/1985

OTHER PUBLICATIONS

"Registered VIP Cashout", Crazy Eights Casino, (http //207 112 121 5/html/cashout htm), download date: Mar. 16, 1998.

Description of Tokenization Feature in Gaming Machines written by IGT, published prior to 2000.

Non-Final Office Action dated Dec. 23, 2003 from U.S. Appl. No. 10/439,357, pp. 1-9.

Non-Final Office Action dated Jun. 26, 2008 from U.S. Appl. No. 11/014,078, pp. 1-10.

Non-Final Office Action dated Jun. 7, 2002 from U.S. Appl. No. 09/819,175, pp. 1-12.

* cited by examiner

METHODS AND APPARATUS FOR OPERATING A GAMING DEVICE

This application claims the benefit of U.S. Provisional Application Ser. No. 60/581,560, filed on Jun. 21, 2004 in the name of Walker et al. and entitled METHODS AND APPARATUS FOR OPERATING A GAMING DEVICE.

This application is also a continuation-in-part of U.S. application Ser. No. 10/829,420, filed Apr. 21, 2004 in the name of Walker et al. and entitled METHOD AND APPARATUS FOR OPERATING A GAMING DEVICE TO DISPENSE A SPECIFIED AMOUNT;

which is a continuation application of U.S. application Ser. No. 10/348,629, filed on Jan. 21, 2003 in the name of Walker et al., entitled METHOD AND APPARATUS FOR OPERATING A GAMING DEVICE TO DISPENSE A SPECIFIED AMOUNT, and issued as U.S. Pat. No. 6,743,097 on Jun. 1, 2004;

which in turn is a continuation of U.S. application Ser. No. 09/709,239, filed on Nov. 10, 2000 in the name of Walker et al., entitled METHOD AND APPARATUS FOR OPERATING A GAMING DEVICE TO DISPENSE A SPECIFIED AMOUNT, and issued as U.S. Pat. No. 6,537,151 on Mar. 25, 2003;

which in turn is a continuation of U.S. application Ser. No. 09/052,667, filed on Mar. 31, 1998 in the name of Walker et al., entitled METHOD AND APPARATUS FOR OPERATING A GAMING DEVICE TO DISPENSE A SPECIFIED AMOUNT, and issued as U.S. Pat. No. 6,168,522 on Jan. 2, 2001.

The entirety of each of the above applications is incorporated by reference herein for all purposes.

DETAILED DESCRIPTION

Figure 1:
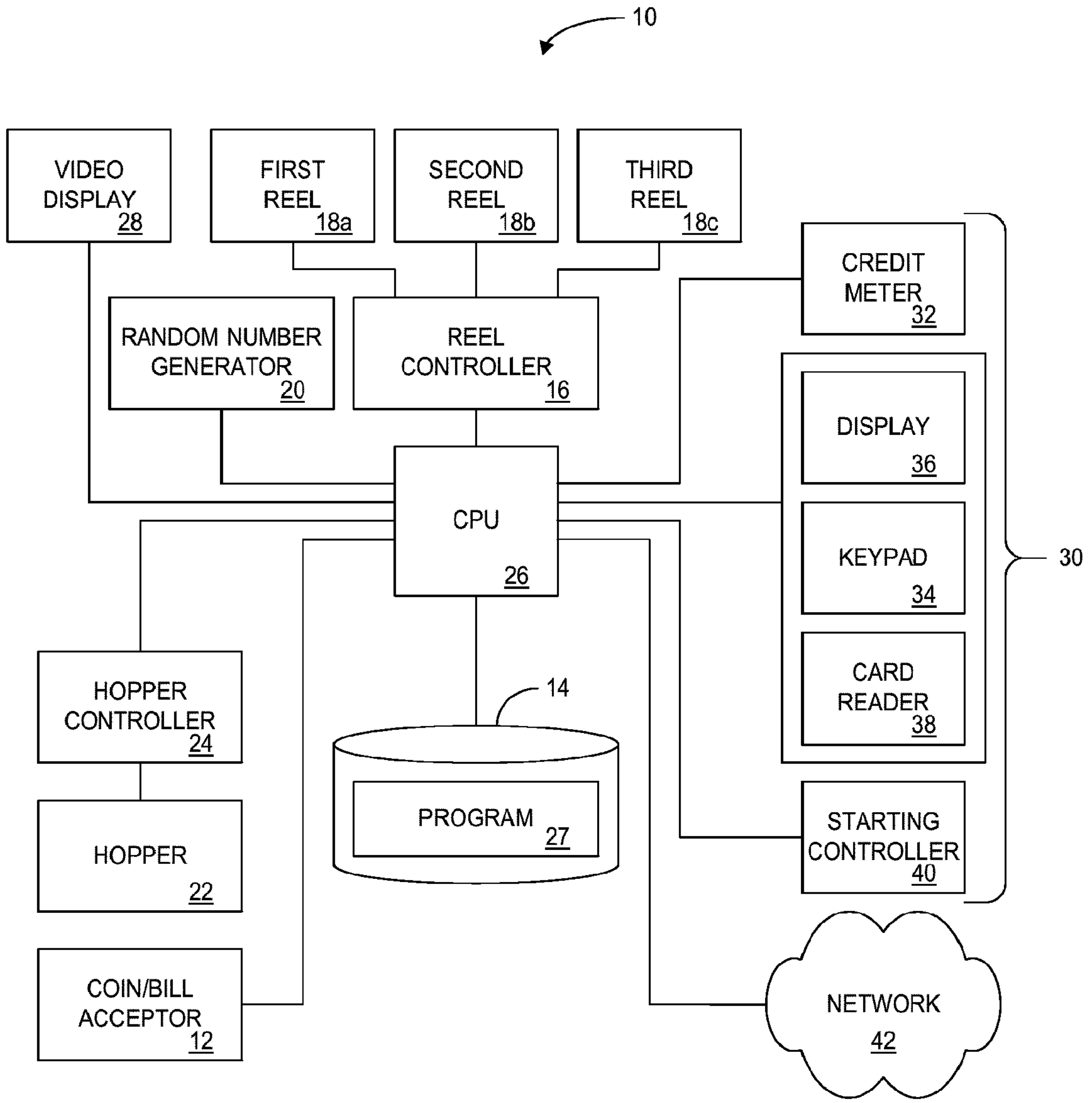
FIG. 1 is a block diagram of a slot machine provided in accordance with the present invention.

The present invention relates generally to gaming devices and more specifically to gaming devices which dispense monetary output.

A conventional gaming device, such as a slot machine, video poker machine or video blackjack machine, typically requires a player to establish an initial "balance" with the gaming device by providing the gaming device with monetary input. For example, the player may insert currency (bill, coins and/or tokens) into the gaming device. Alternatively, the player may have funds transferred to the gaming device from an account such as a credit card account or casino account. Such an account would typically be identified by a card inserted into the gaming device, though other methods by which players may identify such accounts are contemplated (e.g., a player enters an account number using an input device, a biometric associated with a player is received, and so on). Once a balance is established, it is available for initiating a play of the gaming device.

The player then selects a wager amount, which is subtracted from the balance, and initiates a play, for example, by pulling a handle or pressing a button on the gaming device. In response, the gaming device generates a game outcome and a corresponding winning amount that is based on the game outcome. The winning amount may be zero for unfavorable game outcomes, or a greater amount for more favorable outcomes. Typically, greater winning amounts correspond to more unlikely game outcomes. The balance is increased by the winning amount, thereby generating an adjusted balance that is available for initiating a subsequent play of the gaming device.

After any number of such plays, the player may direct the gaming device to dispense the adjusted balance, thereby providing the player with monetary output. Dispensing typically includes activating a hopper in the gaming device to dispense currency to the player. Some gaming devices alternatively credit a credit card or other account with the dispensed amount, eliminating the need for the player to hold and carry dispensed currency. After dispensing, the balance of the gaming device is zero, and another initial balance must be established before subsequent plays of the gaming device may be initiated.

Dispensing the entire balance of the gaming device is often inconvenient for the player. Many players want to separate the amount used to establish an initial balance from any winning amounts awarded by the gaming device, so that the player can play with "house money" (money awarded while playing) and not "his own" money. Such players may establish an initial balance with $10, play until the balance increases (e.g. to $15), request a "cash out" (a dispensing of currency), and finally re-insert the $5 of "house money" to establish another initial balance.

A player may also require money from the gaming device while he is playing. For example, a player may desire to purchase food or drinks from a cocktail server, tip a cocktail server, or provide a companion with currency. In such situations, the player must request a cash out to dispense the balance, use a portion of the dispensed amount, and then re-supply the gaming device with the remaining amount to continue playing.

Dispensing the entire balance of the gaming device is often undesirable to the casino that profits from the gaming device.

Each time a player cashes out (has currency dispensed to him), he may decide to stop playing, particularly given the need to re-supply the gaming device with more monetary input. Further, the time spent dispensing the entire balance to the player and re-supplying the gaming device with monetary input is time during which no plays can occur. Accordingly, such time represents lost profits to the casino. In addition, dispensing currency exerts wear and tear on various components of the gaming device, and may eventually require repair and/or replacement of those components.

In light of some of these drawbacks, some businesses offer similar games for personal computer users. Golden Palace is an "on-line" casino that allows a player to play several games using a computer connected to the Internet. Players establish a balance with a credit card account, bank funds transfer or check mailed to a predetermined address. That balance is adjusted accordingly by wager amounts and winning amounts. After one or more plays, the player can specify an amount of the adjusted balance to be dispensed. If a credit card account was used with the Golden Palace, the specified amount to dispense is credited back to the account, up to the total of the original credit card charges. Any remaining amount to dispense is made in the form of a bank funds transfer or check mailed to the player.

Golden Palace is limited in that it is not a gaming device, but is instead an on-line communications channel that facilitates gaming. Accordingly, Golden Palace cannot accept or dispense currency, and so many players will find the corresponding gaming experience highly unsatisfying. The delay in receiving any winnings due tends to further diminish the thrill of winning. In addition, winnings that are mailed out in the form of a check require that the player cash the check at a bank, further increasing the delay in receiving the winnings. A further inconvenience inherent in Golden Palace is the delay and difficulty in establishing an initial balance.

It would be advantageous to provide a method and apparatus that overcomes the above-described drawbacks of conventional gaming devices.

The present invention overcomes the above-described drawbacks of conventional gaming devices by enabling a gaming device to dispense a portion of a balance of the gaming device.

In accordance with one or more embodiments of the present invention, a gaming device, such as a slot machine, determines a balance and a "dispensed amount" that is less than the balance. The dispensed amount may be determined by, for example, receiving signals from the actuation of one or more keys, in which the signal specifies the dispensed amount. Alternatively, the dispensed amount may be determined in accordance with one or more "balance management rules". The gaming device in turn dispenses the dispensed amount, for example, by dispensing an amount of currency, transferring the dispensed amount to an account or adjusting a balance of a remote gaming device. The balance is adjusted by the dispensed amount, and this adjusted balance is available for initiating a subsequent play of the gaming device.

In accordance with one or more embodiments, a method comprises determining a monetary amount associated with a gaming device, determining a portion of the monetary amount, and outputting the portion. In one embodiment, the monetary amount may comprise, for example, a balance available for wagering. For example, a portion of the balance may be determined according to a rule or based on a player request. Outputting the portion may comprise, for example, dispensing at least one of coins, bills and tokens, crediting an account (e.g., an account associated with a cashless gaming receipt that is output and redeemable for the portion), outputting an instrument indicative of the portion (e.g., printing a cashless gaming receipt) or transferring electronic credits to another gaming device.

In accordance with one or more embodiments, a method comprises establishing a balance at a gaming device, determining a portion of the balance that is less than the balance, and dispensing the portion to a player as a dispensed amount.

In accordance with one or more embodiments, a method comprises determining a balance of a gaming device, subtracting an amount from the balance, the amount being less than the balance, and causing a printer to print a cashless gaming receipt for the amount.

In accordance with one or more embodiments, a method comprises (i) determining a denomination accepted by a gaming device, (ii) determining a balance of the gaming device, (iii) determining whether the balance is a whole number multiple of the denomination, (iv) determining, if the balance is not a whole number multiple of the denomination, an amount that is a difference between the balance and a largest whole number multiple of the denomination that is less than the balance, and (v) outputting an indication of the amount. In one embodiment, outputting an indication of the amount may comprise, for example, dispensing at least one of coins, bills or tokens in the amount. In another embodiment, outputting an indication of the amount may comprise causing a cashless gaming receipt that is exchangeable for cash in the amount. In one or more embodiments, the balance may be reduced by the amount once the indication is output. In one or more embodiments, the method may be initiated upon an output of a portion of a current balance of the gaming device (e.g., upon a player requesting an output of a "tip ticket", as described below).

In one or more embodiments, a method comprises determining a balance of a gaming device, receiving a request to purchase at least one game play on a gaming device with at least a portion of the balance, determining an amount of the balance required to purchase the at least one game play, subtracting the amount from the balance, and outputting an instrument indicative of the at least one game play. In one embodiment, the instrument may comprise, for example, a cashless gaming receipt usable as payment for the at least one game play.

Referring now to FIG. 1, a slot machine 10 includes a coin/bill acceptor 12 for accepting coins, bills and tokens, thereby allowing a player to establish a balance with the slot machine 10. The slot machine 10 also includes a memory 14 for storing the balance and other data described below, such as a table of outcomes, probabilities of the outcomes and corresponding winning amounts for the outcomes.

The slot machine 10 further includes a reel controller 16, a set of reels 18*a*-18*c* in communication therewith, and a random number generator 20. In response to the initiation of play, the random number generator 20 and the reel controller 16 operate to determine and display an outcome defined by a combination of reel positions. The initiation of play causes the reels 18*a-c* to spin under the control of the reel controller 16, and to stop at the specified combination reel positions. The slot machine 10 further includes a hopper controller 24 and a hopper 22 in communication therewith. The hopper 22 stores a supply of currency, and the hopper controller 24 controls the amount of currency to be received by or dispensed from the hopper 22.

The slot machine 10 further includes a central processing unit (CPU) 26 which is in communication with the coin/bill acceptor 12, the memory 14, the reel controller 16, the random number generator 20 and the hopper controller 24. The CPU 26 provides control functions described in more detail below. A program 27 stored in the memory directs the CPU 26 in accordance with the present invention, and particularly in accordance with the processes described in detail hereinafter.

The slot machine 10 may also include a video display 28, in communication with and controlled by the CPU 26, to display the outcome of a play. Such a video display 28 may be provided in addition to, or instead of, the set of reels 18*a*-18*c*. A player interface 30, also in communication with and controlled by the CPU 26, comprises a credit meter 32 for displaying the player's balance, a keypad 34 for entering data, a display 36 for displaying the data, error messages and other information, and a card reader 38 for reading a player's card. The keypad 34 may include electro-mechanical buttons, a touch screen, or any other suitable data input means that allows the player to request an amount to be dispensed from the slot machine.

The slot machine 10 can be operatively connected to a network 42. Such a connection allows the slot machine 10 to access account information, verify account status, and allows balances to be dispensed or transferred between gaming devices. Also in communication with the CPU 26 is a starting controller 40, which the player operates to initiate a play. The starting controller 40 may be, for example, a handle pulled by the player or a button actuated by the player.

Of course, one of ordinary skill in the art, upon reading the present disclosure, would understand that the slot machine 10 can include other conventional components which need not be described in detail herein. Examples of such components include, but are not limited to, a secondary screen for displaying bonus round information, a printer for printing cashless gaming receipts, a cashless gaming receipt reader, a magnetic card reader for reading a credit or debit card, a player tracking module such as a reader device for reading data from player tracking cards and/or smart cards and/or a mechanism for attracting casino personnel (e.g., a help button and/or a flashing light atop the slot machine).

As described, in some embodiments, a gaming device may comprise a reader device for reading data from player tracking cards and/or smart cards, such that (i) players may be identified, and (ii) various data associated with players may then be determined (e.g., a number of cashable credits; a number of promotional credits that may not be redeemed for cash; a number of accumulated loyalty points; a number of accumulated game elements such as symbols, cards or hands; etc.). In one example, a card reader device may determine an identifier associated with a player (e.g., by reading a player tracking card comprising an encoded version of the identifier), such that the gaming device may then access data (e.g., of a player database, as described) associated with the player. In another example, a smart card reader device may determine data associated with a player directly by accessing a memory of an inserted smart card.

Thus, as known in the art, "smart cards" may incorporate (i) a memory, and (ii) means for accessing such a memory. For example, in one embodiment, the memory may store data related to aspects of the present invention. In one embodiment, data may be written to the smart card as a player plays one or more gaming devices (e.g., such that various data may be updated on a continuous, periodic or event-triggered bases). Accordingly, in one or more embodiments one or more devices operable to carry out various processes of the present invention (e.g., a gaming device or kiosk) may have associated therewith a smart card reader device, such that data may be read from the smart card pursuant to the execution of such processes. An example of a smart card system that may be used to implement one or more embodiments of the present invention is the s-Choice™ Smart Card Casino Management System from Smart Card Integrators, Inc.™.

Further, as known in the art, a gaming device may comprise a player tracking module comprising (i) a card reader (e.g., a port into which player tracking cards may be inserted), (ii) various input devices (e.g., a keypad, a touch-screen), (iii) various output devices (e.g., a small, full-color display screen), and/or (iv) combinations thereof (e.g., a touch-sensitive display screen that accommodates both input and output functions). Various commercially available devices may be suitable for such an application, such as the NextGen™ interactive player tracking panel manufactured by IGT or the iVIEW display screen manufactured by Bally® Gaming and Systems.

Of course, other non-card-based methods of identifying players are contemplated. For example, a unique identification code may be associated with the player. The player may then be identified upon entering the code. For example, the code may be stored (e.g., within a database maintained within the gaming device and/or a server) such that the player may enter the code using an input device of a gaming device, and accordingly be identified. In other embodiments, player biometrics may serve as identification means (e.g., a player is identified via a thumbprint or retinal scan). In further embodiments, a barcode of a cashless gaming ticket may encode a player identifier.

Figure 2:
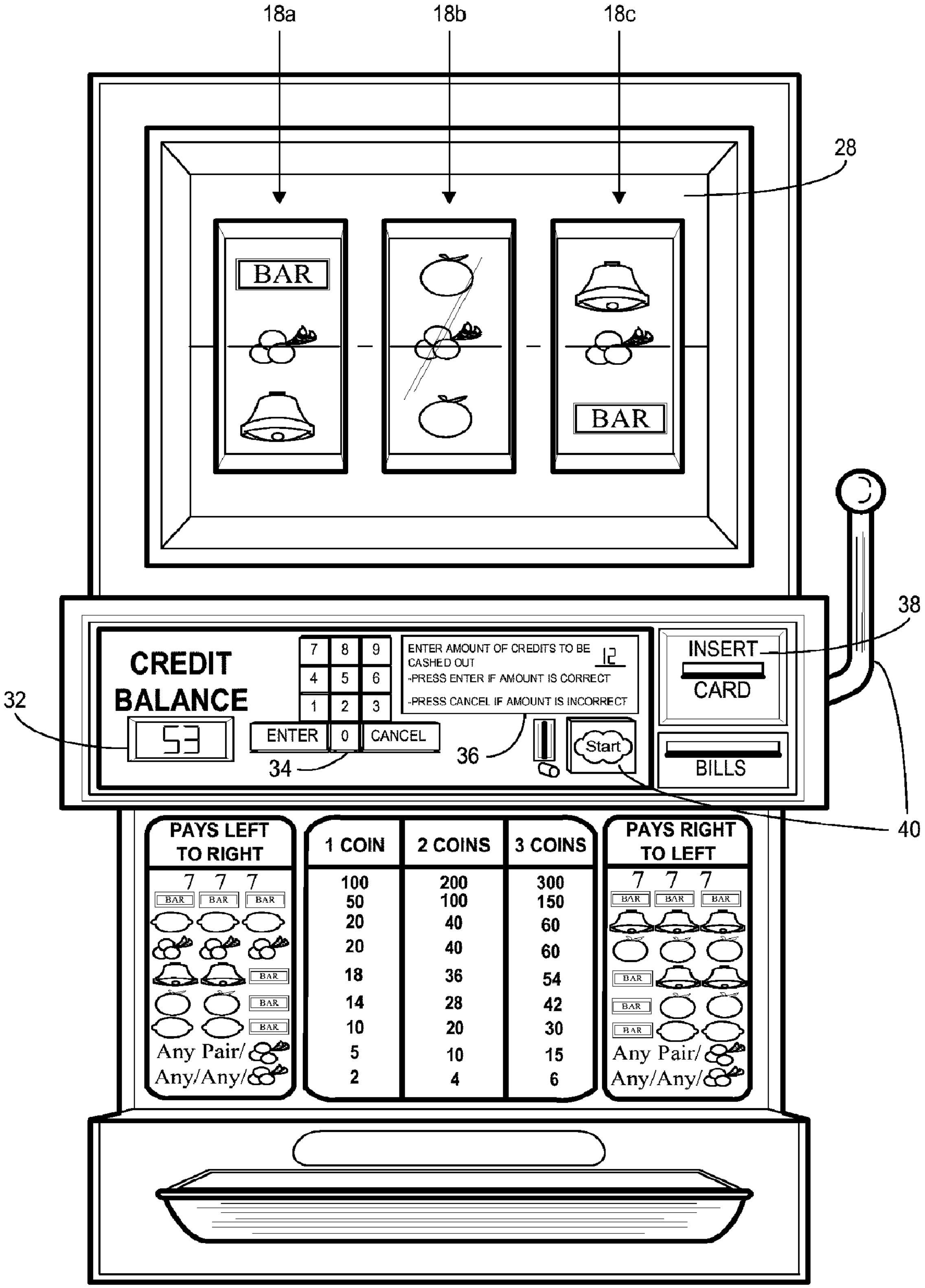
FIG. 2 is a rendering of an embodiment of the slot machine of FIG. 1.

Referring to FIG. 2, a first embodiment of a slot machine according to the present invention is shown from a player's perspective. The slot machine of FIG. 2 includes the video display 28 for displaying the positions of reels 18*a-c*, the credit meter 32, the keypad 34, the display 36, the card reader 38, and the starting controller 40. In the illustrated embodiment, the keypad 34 is a 10-digit keypad which enables a player to numerically enter an amount to be dispensed, and the display 36 displays a numeric value representing the amount entered.

Figure 3:
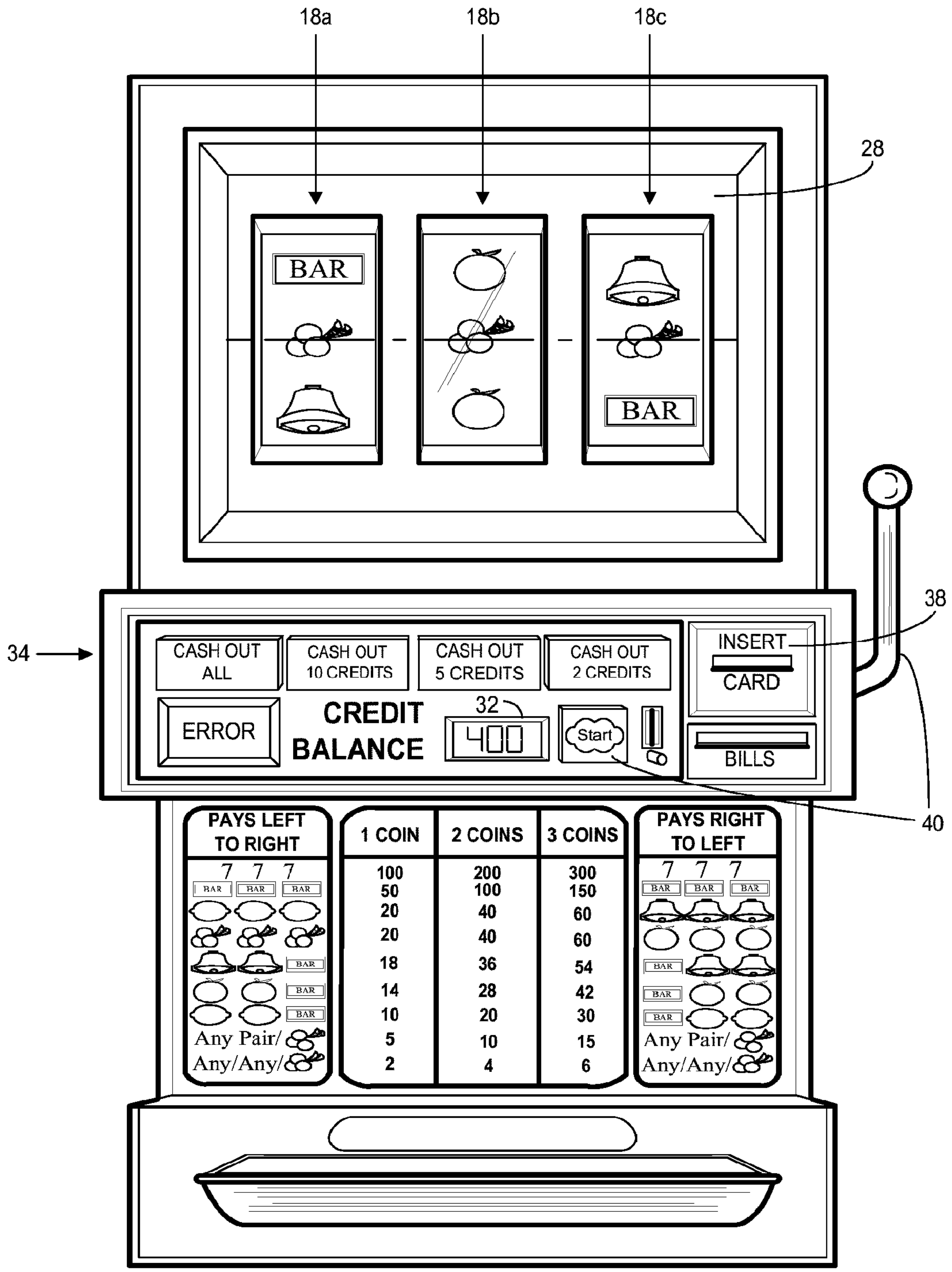
FIG. 3 is a rendering of another embodiment of the slot machine of FIG. 1.

Referring to FIG. 3, a second embodiment of a slot machine according to the present invention is shown. The embodiment of FIG. 3 is similar to the embodiment of FIG. 2, except that the keypad 34 shown in FIG. 3 includes four keys which enable a player to select one of four predetermined amounts to dispense ("all credits", "ten credits", "five credits", or "two credits" or, similarly, "$0.50", "$1.00", "$1.50", or "$5.00"). The keypad 34 may include any number of keys, each corresponding to a different amount to dispense. Keys can also be provided to enable the player to request a percentage of the balance to be dispensed (e.g., to dispense one-half of the balance). Thus, for example, a player may indicate an amount to dispense by selecting a predetermined amount (e.g., $1.50) and a cashless gaming receipt for this predetermined amount may be printed. The player may then provide this cashless gaming receipt to a casino employee as a gratuity or use it to purchase a product (e.g., a drink or snack).

In another example of selecting a cashout from a plurality of predetermined options, a player may be presented with several "pre-packaged" cashout options. For example, a slot machine might offer a player cashing out $26.00 as either: (i) a cashless ticket redeemable for $26; (ii) $26 in cash; (iii) $20 cash and a $10 buffet credit; (iv) a $25 cashless ticket and a $1 tip ticket, (v) a cashless gaming receipt for $25.00 plus a tip ticket for $2.00, etc. Thus, the player may be provided with a variety of options or manners in which to receive the entirety of his or her balance in various portions.

Figure 4A:
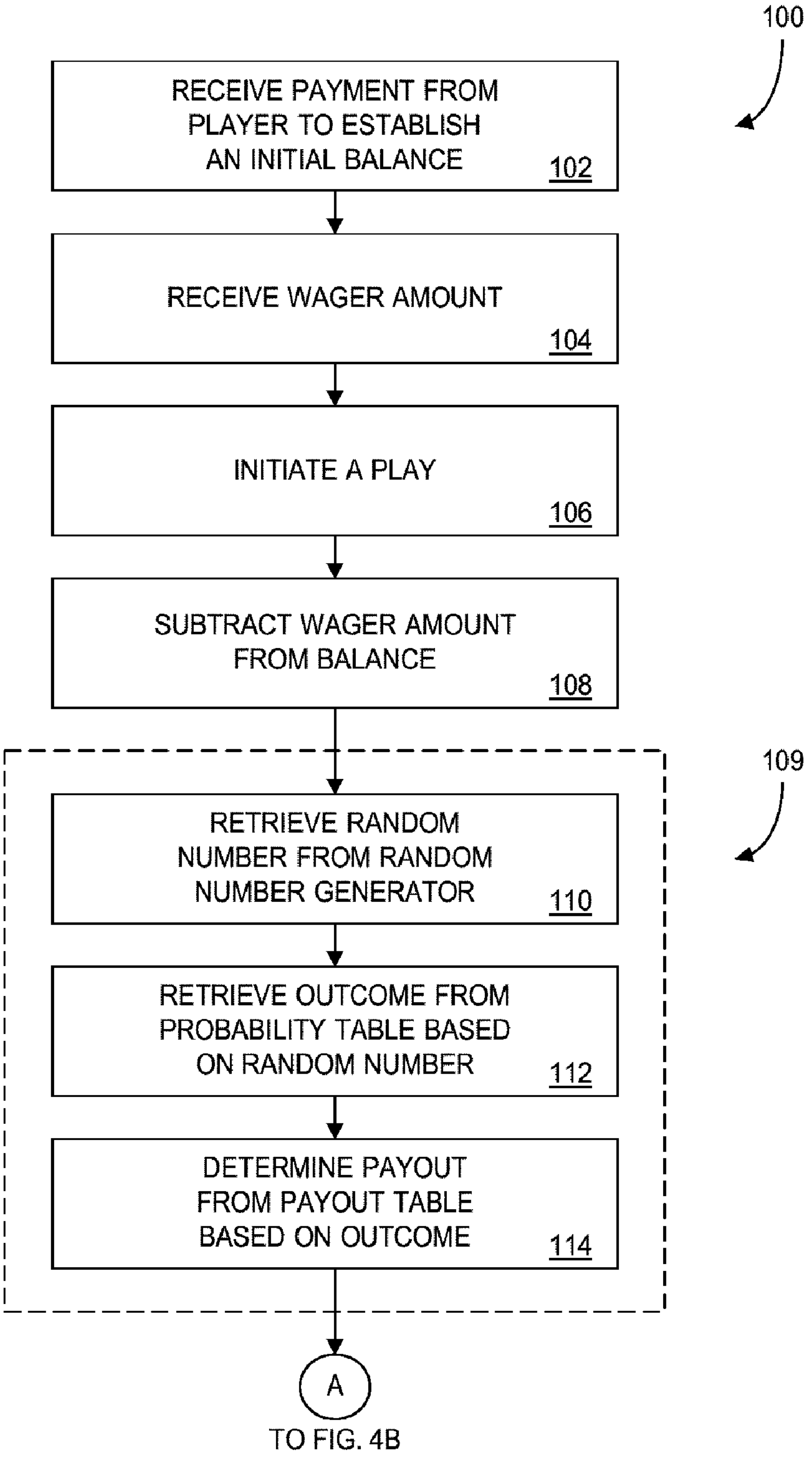
FIGS. 4A and 4B are a flow chart illustrating a method of operating a gaming device according to the present invention.
Figure 4B:
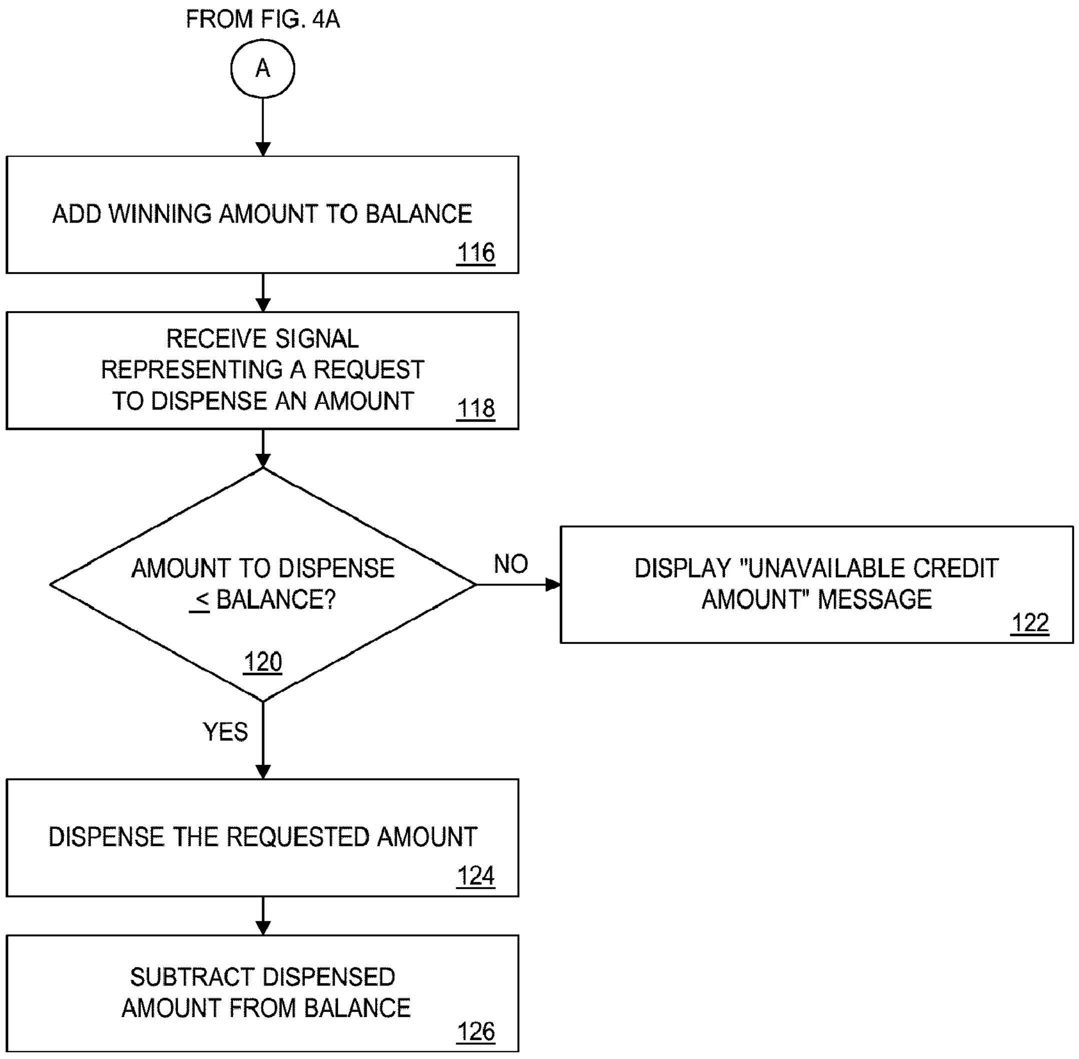

Referring now to FIGS. 4A and 4B, a flow chart illustrates a process 100 for operating a gaming device to provide a monetary output. The gaming device first establishes a balance after payment is received from the player (step 102), and then receives a wager amount (step 104), typically when the player presses a key indicating the wager amount. As would be understood by one of ordinary skill in the art upon reading the present invention, payment from the player may be in any conventional form, such as coins, bills, tokens, cashless gaming receipts, electronic credits or credit or debit cards. As would also be understood by one of ordinary skill in the art upon reading the present disclosure, the balance may be established based on the payment amount. A play of the gaming device is initiated in response to the player activating the starting controller (step 106). The wager amount is subtracted from the balance (step 108), and the remaining balance is displayed on the credit meter 32 (FIG. 1).

In response to the initiation of play, the gaming device generates a game outcome and a corresponding winning amount that is based on the game outcome, as collectively indicated by reference numeral 109. Typically, the game outcome and winning amount are generated by (i) retrieving a random number (step 110), (ii) retrieving an outcome based on the random number from a probability table (step 112), and (iii) determining a winning amount based on the random number from a payout table (step 114). In a slot machine, the reel controller would also direct the reels to spin and finally stop at positions corresponding to the outcome.

The balance is increased by the winning amount, thereby generating a first adjusted balance that is available for initiating a subsequent play of the gaming device (step 116). Thereafter, the gaming device receives a signal representing a request to dispense an amount (step 118). In accordance with the present invention, the amount may be less than the first adjusted balance. As described above, a player may find it useful to dispense less than the first adjusted balance in order to pay for a food or drink or to provide a gratuity to a waitress or other casino employee. If the requested amount to dispense is greater than the balance, then the gaming device displays a suitable message to the player (steps 120 and 122). Otherwise, the gaming device dispenses the requested amount (step 124), and the dispensed amount is subtracted from the first adjusted balance (step 126), yielding a second adjusted balance. If the second adjusted balance is zero, a balance must again be established before play can resume.

The above described step 124 of dispensing the requested amount may include dispensing an amount of currency that is based on the requested amount. More specifically, the gaming device may activate the hopper 22 (FIG. 1) to dispense an amount of currency that is based on the requested amount. Alternatively, the gaming device may transfer the requested amount to an account, such as a credit card account or an account maintained with the casino. As would be understood by one of ordinary skill in the art upon reading the present disclosure, the amount of currency may be dispensed in any conventional manner, such as by outputting at least one of coins, bills and tokens, outputting a cashless gaming receipt, or transferring electronic credits to an account. In one embodiment, as would be understood by one of ordinary skill in the art upon reading the present disclosure, transferring electronic credits to an account may be performed in embodiments in which a cashless gaming receipt is output (a process described in more detail with respect to FIG. 14, described below).

For example, if a player requests a dispensed amount for the purpose of providing a gratuity to a casino employee, as described above, the dispensed amount may be dispensed in the form of a cashless gaming receipt having printed thereon an indication of the dispensed amount. This cashless gaming receipt may be provided by the player to a casino employee, who may exchange the cashless gaming receipt for cash. Providing the dispensed amount in the form of a cashless gaming receipt may avoid additional wear and tear on the hopper mechanism of the slot machine, which may be desirable as described above. Providing a tip ticket rather than a tip in the form of cash also allows a casino to track and tax tips in an easier and more reliable manner. The practice of cashless gaming receipts representative of an amount of funds being exchange for cash by a casino is well known in the art, and need not be described in detail herein. In another example, the dispensed amount may be dispensed in the form of one or more other types of casino tokens that the player may, for example, provide to a casino employee as a gratuity.

As would be understood by one of ordinary skill in the art upon reading the present disclosure, it may be desired by some casinos to deter the use of a gratuity as a means for funding game play on a gaming device. Accordingly, in embodiments where the dispensed amount is provided in the form of a cashless gaming receipt for the purpose of being provided to a casino employee as a gratuity (such a receipt may be referred to as a "tip ticket"), the receipt may be printed or otherwise provided in a manner that precludes the tip ticket from being subsequently used to fund game play at a gaming device. For example, the receipt may have a layout not readable by a gaming device and/or may include an indicia (e.g., a bar code) that indicates to the gaming device that the receipt is not usable for funding game play.

In another embodiment, the step 124 of dispensing the requested amount may include transferring the requested amount to another gaming device. In such an embodiment, the gaming device would be in communication with a remote gaming device, for example, through a casino-wide communications network. The gaming device would adjust the balance of the remote gaming device, adding the dispensed amount thereto. Such a transfer among gaming devices is especially advantageous in that players may share funds. For example, if a husband and wife are playing at different slot machines, and the husband runs out of funds (reaches a balance of zero), he can send a request that his wife transfer some portion of her balance to his slot machine. Alternatively, the wife may initiate such a transfer on her own.

Figure 5:
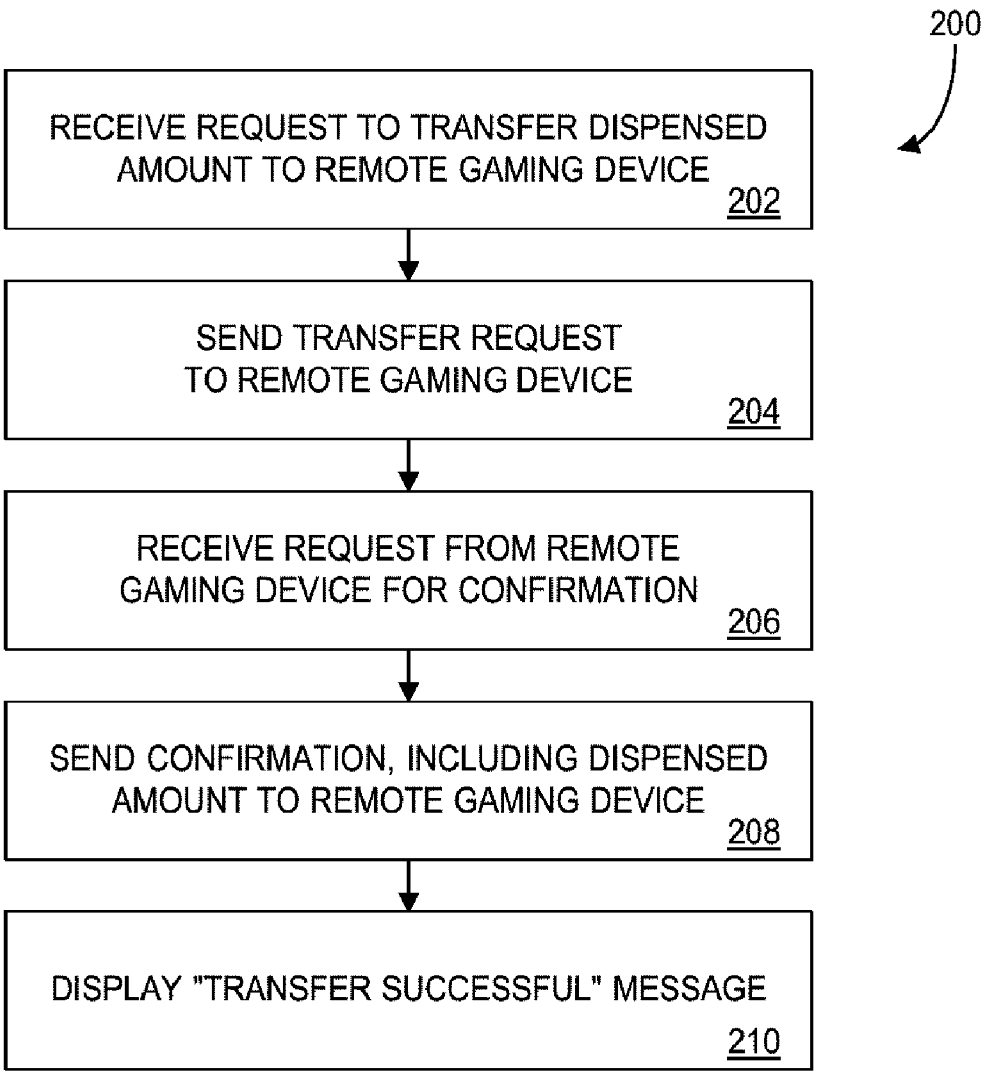
FIG. 5 is a flow chart illustrating a process for dispensing that is performed by a source gaming device.

Referring to FIG. 5, a process 200 represents one embodiment of the above-described step 124 (FIG. 4B) of dispensing. The gaming device ("source gaming device") receives from the player a request to transfer an amount to dispense (hereinafter a "dispensed amount") to a remote gaming device (step 202). The request specifies the remote gaming device in an appropriate manner. For example, the player may enter a unique identifier of the remote gaming device. Alternatively, the player may be presented with a list of players who are currently using "player tracking cards" with gaming devices on the network. Such player tracking cards typically identify players by name, thus facilitating the selection of a remote gaming device by the name of the corresponding player. It may be further advantageous to require that the player enter a password when requesting a transfer.

After the request is received, the source gaming device sends the transfer request through the network to the remote gaming device (step 204). The remote gaming device thus receives an indication of the dispensed amount and an identifier of the source gaming device. To prevent erroneous transfers, the remote gaming device responds by requesting confirmation of the requested transfer. The source gaming device receives this request for confirmation (step 206), and sends back a confirmation (step 208) which again indicates the dispensed amount. Finally, the source gaming device displays an appropriate message (step 210) to indicate to the player that the transfer was successful.

Figure 6:
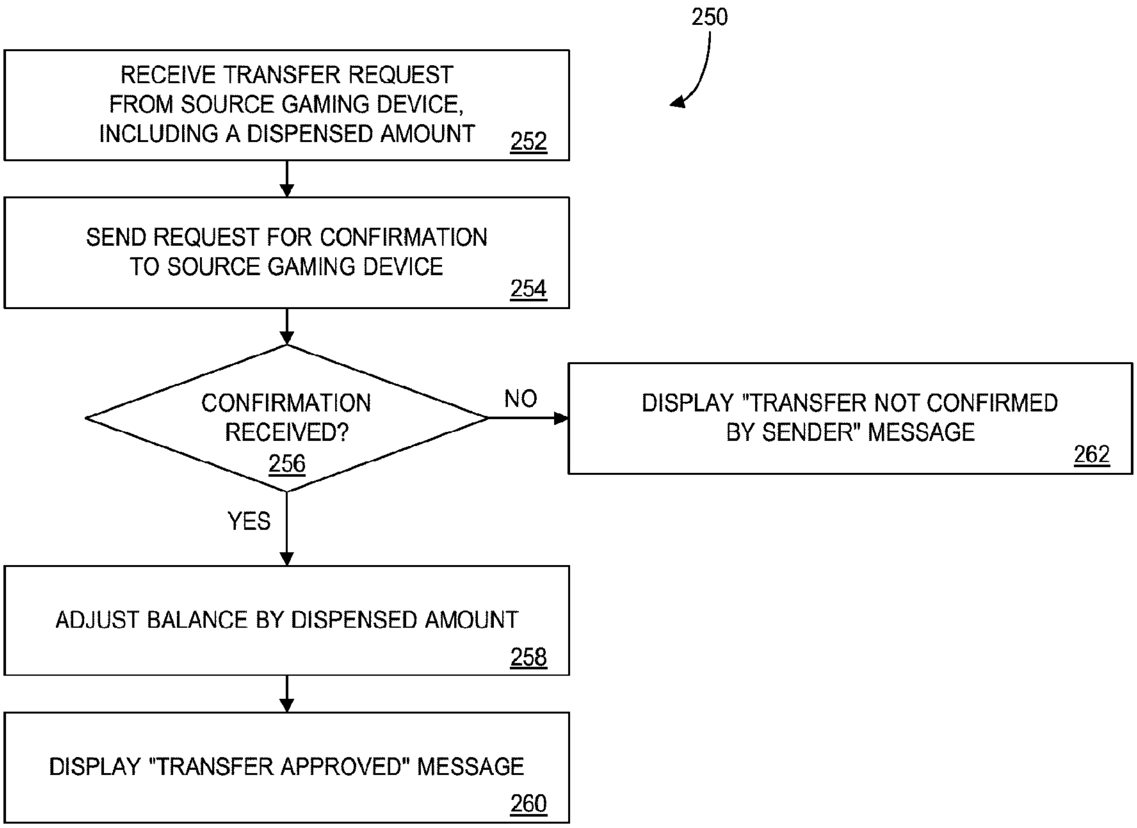
FIG. 6 is a flow chart illustrating a process for dispensing that is performed by a remote gaming device.

FIG. 6 describes a process 250 performed by the remote gaming device while the source gaming device performs the process 200 (FIG. 5). The remote gaming device first receives the transfer request from the source gaming device (step 252). As described above, this request includes an indication of the dispensed amount and an identifier of the source gaming device. The remote gaming device then sends a request for confirmation to the identified source gaming device (step 254). If the remote gaming device receives confirmation (step 256), then its balance is adjusted by the dispensed amount (step 258) and the remote gaming device displays an appropriate message indicating that the transfer was approved (step 260). Such a message may also identify the dispensed amount and the source gaming device. If the remote gaming device does not receive confirmation, then a corresponding message is displayed (step 262). In one embodiment, a signal from a first gaming device may not only cause funds to be transferred to a second device, but may also cause the second gaming device to release coins from its hopper mechanism.

Figure 7:
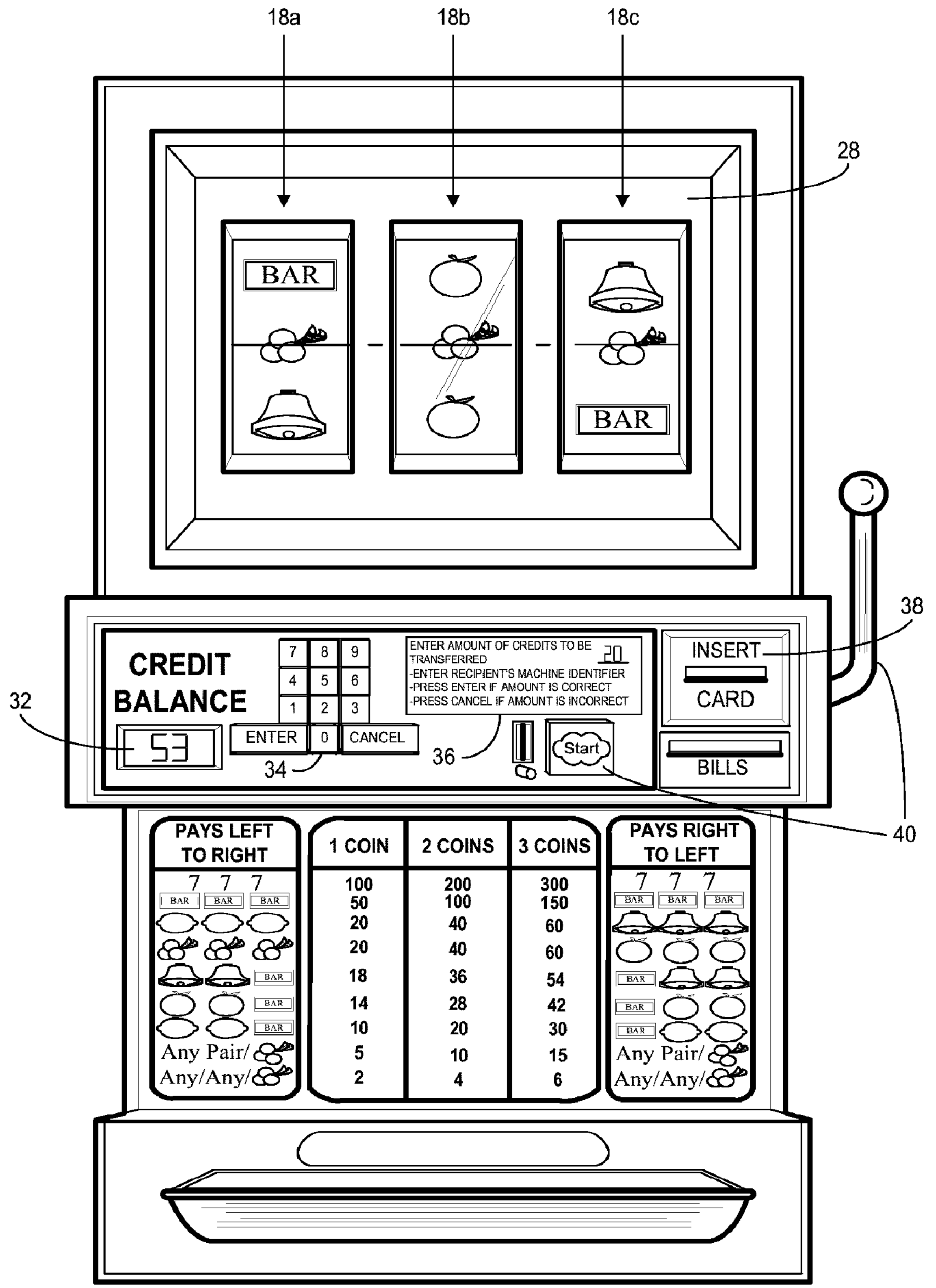
FIG. 7 is a rendering of another embodiment of the slot machine of FIG. 1.

Referring to FIG. 7, the display 36 of a source slot machine shows text which is presented to the player when he has requested a transfer to a remote slot machine (not shown). As illustrated, the display includes appropriate messages such as an indication of the dispensed amount, and instructions for indicating the remote slot machine. Analogously, the display of the remote slot machine would show text, such as "Player of machine X requests a transfer ofY credits to this machine", and "Press enter to accept transfer or cancel to reject transfer".

Although in the above-described processes a player of the source gaming device initiated the transfer, in another embodiment the player of the remote gaming device may initiate the transfer by first sending such a request to the source gaming device. Thereafter, the processes described above would proceed accordingly in a manner that will be understood by those skilled in the art.

As described above, the gaming device may determine the dispensed amount by receiving a signal that specifies the dispensed amount. Such a signal may be generated by the player pressing one or more keys on the keypad 34 (FIG. 1). In another embodiment, the dispensed amount may be determined in accordance with one or more balance management rules (e.g., one or more rules applied by a gaming device upon the occurrence of a predetermined condition). Such balance management rules may be entered by the player, or may be selected after the player is presented with a list of possible rules. In yet another example of how a gaming device may determined the dispensed amount, the gaming device may determine the dispensed amount in accordance with a balance management rule determined other than by selection of the player. For example, a gaming device may be programmed to apply one or more balance management rules irrespective of the players selection of a balance management rule or a casino employee may select a balance management rule to be applied.

Figure 8:
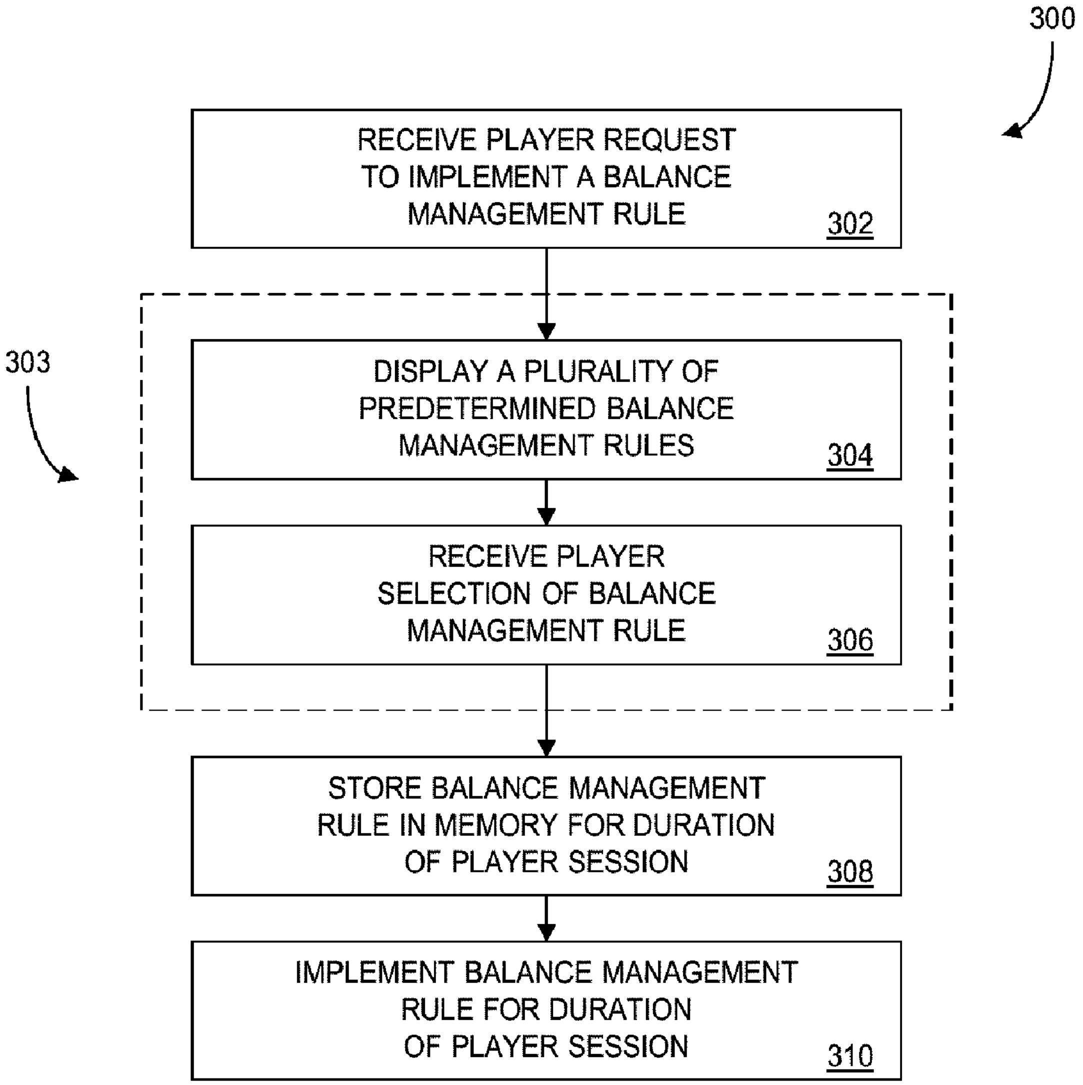
FIG. 8 is a flow chart illustrating a process for determining a dispensed amount in accordance with a balance management rule.

Referring to FIG. 8, a process 300 initiates when the gaming device receives a request to implement a balance management rule (step 302). For example, initiating game play on the gaming device may comprise a request to implement one or more balance management rules programmed into the gaming device. The player then indicates the rule or rules he would like implemented, as indicated by reference numeral 303. Typically, the player indicates his desired rules by selecting from a list of possible rules. For example, the gaming device may store in the memory 14 (FIG. 1) a plurality of predetermined rules, or a player tracking card inserted into the gaming device may indicate a plurality of predetermined rules. Accordingly, the gaming device would display the plurality of predetermined balance management rules (step 304) and in turn receive the player's selection of one or more balance management rules therefrom (step 306).

In another embodiment, the player may indicate the rule he would like implemented by entering the rule through keys on the keypad 34 (FIG. 1) or through another appropriate input device. As would be understood by one of ordinary skill in the art upon reading the present disclosure, entering a rule may comprise, for example, entering an indication of a rule (e.g., inserting an instrument that causes an application of a rule). In still another embodiment, the player tracking card may indicate the rules to implement, rather than a plurality of rules from which to select those to be implemented. Inserting the player tracking card into the gaming device would load the indicated rules into the memory 14 (FIG. 1).

Once the player indicates the rule, the rule is stored in the memory 14 for the duration of the player session (step 308), and the rule is in turn implemented for the duration of the player session (step 310). The duration of the player session may be the time period during which the player tracking card remains inserted in the gaming device. Alternatively, the duration may be defined such that the session lasts until the entire balance is dispensed (i.e., the balance reaches zero).

Figure 9:
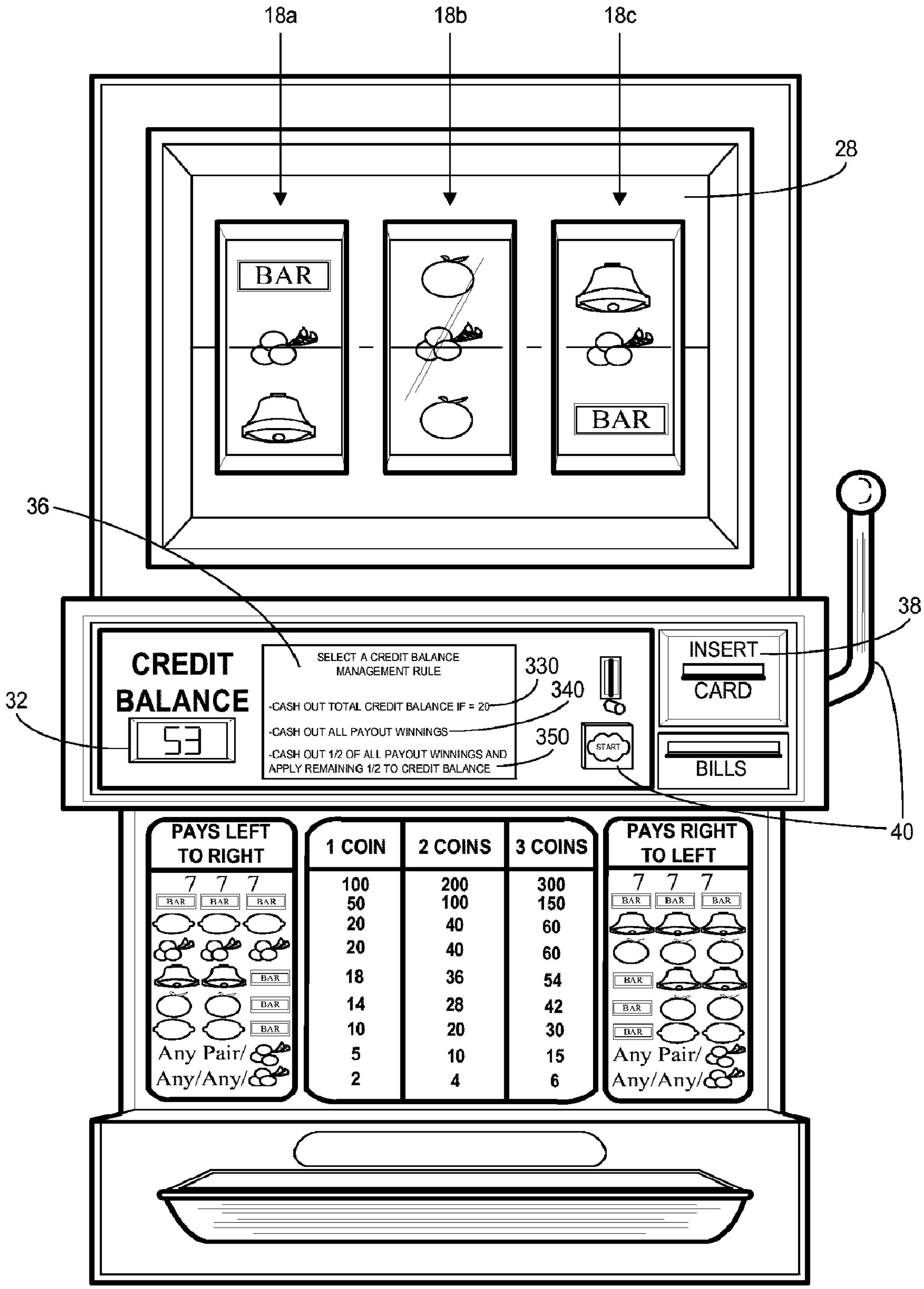
FIG. 9 is a rendering of another embodiment of the slot machine of FIG. 1.

Referring to FIG. 9, the display 36 of a slot machine shows text which is presented to the player when he has requested to implement a balance management rule. As illustrated, the displayed text indicates three possible rules 330, 340 and 350. The player would select from the three possible rules 330, 340 and 350 in any of the manners described above.

A balance management rule (e.g., a balance management rule selected by the player) may specify that the dispensed amount be the difference between the balance and a predetermined threshold. Such a rule would thus specify that any winnings above the predetermined threshold be dispensed. For example, the rule may specify that each time the balance exceeds $50, an amount is dispensed to reduce the balance to $50. Furthermore, such a rule may specify that the predetermined threshold is the initial balance (the amount first provided to establish a balance). Accordingly, any winnings would be dispensed to the player.

Figure 10:
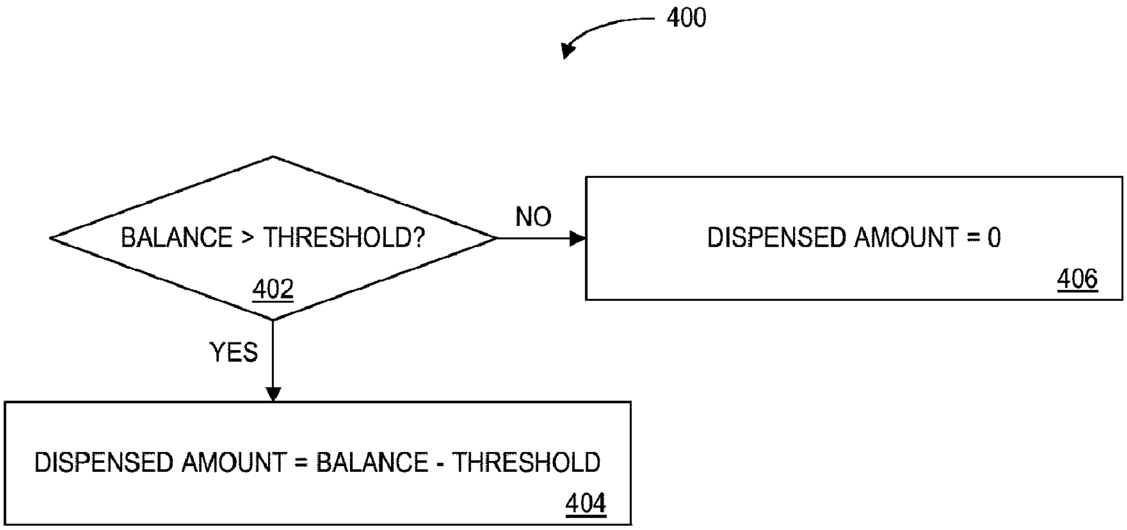
FIG. 10 is a flow chart illustrating a process for determining a dispensed amount in accordance with a first balance management rule.

Referring to FIG. 10, a process 400 for determining a dispensed amount in accordance with such a rule initiates with a determination of whether the balance exceeds the predetermined threshold (step 402). Typically, this determination is made upon each play of the gaming device. If the balance exceeds the predetermined threshold, then the dispensed amount is determined to be the difference between the balance and the predetermined threshold (step 404). Otherwise, the dispensed amount is determined to be zero (step 406), and nothing is automatically dispensed.

Another balance management rule may specify that the dispensed amount be a predetermined percentage of a difference between the balance and a predetermined threshold. For example, the rule may specify that half of the amount of the balance above $50 is dispensed after each play. In accordance with such a rule, if the predetermined threshold is $50, the predetermined percentage is 50%, and the balance is $70, then the dispensed amount is $10 (50% of ($70–$50)=$10). The predetermined threshold may be the initial balance, so that a predetermined percentage of total winnings are dispensed after each play.

Yet another balance management rule may specify that any difference between (i) a current balance and (ii) the highest multiple of a denomination accepted by the slot machine that is less than the balance, be automatically dispensed. For example, assume a $1.00 denomination slot machine (i.e., the slot machine only accepts wagers in multiples of $1.00). Further assume that the current balance of the slot machine (e.g., after dispensing an amount) is $5.50, an amount that is not a multiple of $1.00. A balance management rule of the slot machine may cause the slot machine to automatically dispense $0.50, an amount equal to the difference between (i) the current balance ($5.50 in the present example) and (ii) the highest multiple of a denomination accepted by the slot machine that is less than the current balance ($5.00 in the present example). Such a rule may be helpful, for example, if an amount is dispensed that results in a balance that is not a multiple of a denomination accepted by the slot machine for wagering. For example, as described above, in one embodiment a player may define an amount to be dispensed by selecting an option from a menu of predetermined options (e.g., one-half of the balance, $1.50, two credits, etc.). A selection of some of these choices may inherently, in some circumstances, result in a balance that is not a multiple of a denomination accepted by the slot machine. One of ordinary skill in the art, upon reading the present disclosure of how a portion of a balance may be dispensed, would recognize that a solution to such a result may comprise dispensing an additional amount. As described above, one or more of the dispensed amounts may be dispensed in the form of a cashless gaming receipt. This may be done to avoid wear and tear on the hopper mechanism of the slot machine, as described above.

As described above with respect to FIG. 1, a gaming device may transfer a requested amount to an account, such as a credit card account or an account maintained with the casino (e.g., an account associated with a cashless gaming receipt output to a player). Thus, an example of a balance management rule may comprise a rule that causes a portion of a balance to be transferred to an account upon the occurrence of a predetermined condition. For example, if the current balance is greater than or equal to a predetermined threshold, a predetermined amount (e.g., a predetermined percentage) of the current balance may be transferred to an account maintained by a casino. For example, a casino may maintain a gratuity account for a player, from which the player may provide gratuities to casino personnel. In such a circumstance, a balance management rule may be applied that transfers a portion of a player's balance to the gratuity account upon the occurrence of a predetermined condition (e.g., when the current balance reaches a predetermined threshold and/or upon a player obtaining a winning payout).

Figure 11:
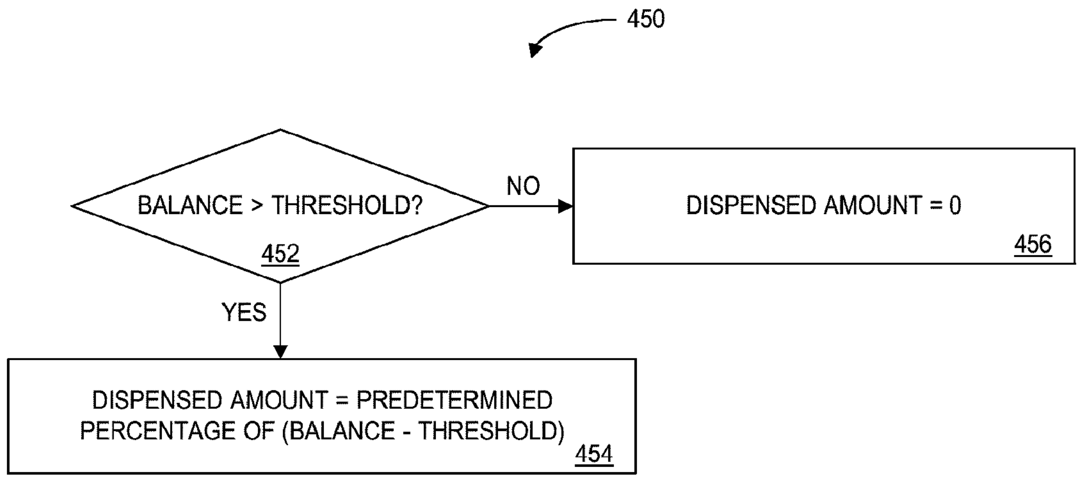
FIG. 11 is a flow chart illustrating a process for determining a dispensed amount in accordance with a second balance management rule.

Referring to FIG. 11, a process 450 for determining a dispensed amount in accordance with such a rule initiates with a determination of whether the balance exceeds the predetermined threshold (step 452). Typically, this determination is made upon each play of the gaming device. If the balance exceeds the predetermined threshold, then the dispensed amount is determined to be the predetermined percentage of the difference between the balance and the predetermined threshold (step 454). Otherwise, the dispensed amount is determined to be zero (step 456), and nothing is automatically dispensed.

Another balance management rule may specify that the dispensed amount be a predetermined percentage of the winning amount earned after each play. For example, the rule may specify that half of each winning amount is dispensed after each play. In accordance with such a rule, if the predetermined percentage is 50%, and a play results in a winning amount of $70, then the dispensed amount is $35 (50% of $70=$35). The undispensed portion of the winning amount ($35) would be added to the balance.

As described above, the dispensing of such an amount may inherently result in a balance that is not a multiple of a denomination accepted by the slot machine. Accordingly, one of ordinary skill in the art would recognize upon reading the present disclosure that the slot machine may be programmed to avoid such a balance that is not a multiple of a denomination accepted by the slot machine.

For example, the slot machine may be programmed to automatically dispense an additional amount that is a difference between (i) the current balance and (ii) the highest multiple of the denomination accepted by the slot machine that is less than the balance. For example, a $1.00 denomination slot machine that, upon dispensing an amount, has a remaining balance of $5.50 may dispense an additional amount of $0.50 in the form of a cashless gaming receipt (e.g., to decrease wear and tear on the hopper mechanism of the slot machine, which is undesirable, as explained in the Background section).

In another example, the slot machine may be programmed to round up or round down the dispensed amount that would otherwise result in a balance that is not a multiple of a denomination accepted by the slot machine and dispense the rounded amount. For example, if a $1.00 denomination slot machine has a balance of $7.00 and a rule specifying that one-half of the balance is to be dispensed is applied (or, e.g., a player requests that $3.50 be dispensed because the player desires to tip the waitress with this amount), the resulting balance would be $3.50. Since $3.50 is not a multiple of $1.00, the slot machine may be programmed to round the amount to be dispensed to a multiple of $1.00 (and thus dispense either $4.00 or $3.00) in order to avoid such a balance.

In one embodiment, the balance management rules may be implemented only after a predetermined number of plays, upon an occurrence of a predetermined outcome or after a predetermined time period. For example, one balance management rule may be implemented an hour after a balance is established, after one hundred plays, or upon an occurrence of a predetermined outcome (e.g., an outcome selected by a player), such as cherry-cherry-cherry.

As described above, many players want to play with "house money" (money awarded while playing) and not "their own" money. For example, a player that establishes an initial balance with $20 may accumulate a balance of $50 after one or more plays. The player may consider $30 ($50−$20) to be an "available amount" to wager with. Accordingly, the present invention facilitates such a playing strategy by allowing the player to have $20 dispensed, and thereby leave the available amount ($30) for subsequent play. In one embodiment, the $20.00 amount may remain stored as credits until cashout but be unavailable for wagering. In another embodiment, a cashless gaming receipt may be output as the form in which the $20.00 is dispensed, with the cashless gaming receipt bearing an indicia that allows the cashless gaming receipt to be redeemed for cash only at a casino cage and/or via a casino employee, such that the cashless gaming receipt is not readable by a gaming device and thus not available for wagering.

In addition, a gaming device provided in accordance with the present invention may further prevent selection of a wager amount that is greater than the available amount or greater than another predetermined amount. For example, a player desiring to set a maximum wager amount for himself may indicate that he does not want to be allowed to place a wager greater than $10.00. In such an example, the gaming device may output a message to the player (e.g., "invalid wager amount, exceeds maximum of $10.00" or the like) whenever the player attempts to place a wager greater than the predetermined amount. In another example, if the balance is $50 and a predetermined threshold is $20, then the corresponding available amount is $30 ($50–$20). Any attempt by the player to select a wager amount greater than $30 would generate a displayed message (e.g., "Invalid wager amount, try again"), and the gaming device would wait until the player selects a wager amount no greater than $30. Thus, the player could play with only "house money", even without having the $20 dispensed. Such a process for preventing selection of wager amounts greater than the available amount may be implemented as a type of balance management rule.

Figure 12:
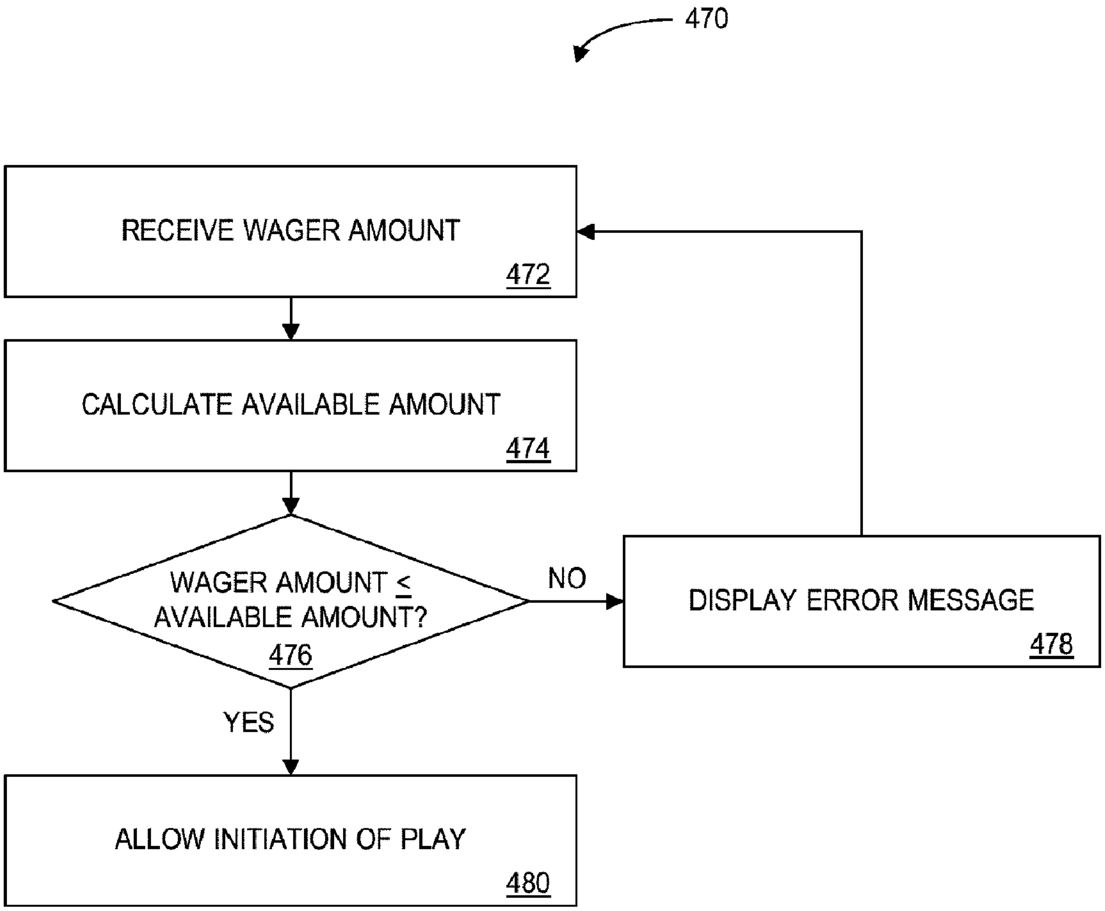
FIG. 12 is a flow chart illustrating a process for preventing selection of a wager amount that is greater than an available amount.

Referring to FIG. 12, a process 470 initiates when the gaming device receives a wager amount from the player (step 472). The gaming device also calculates the available amount by subtracting a predetermined threshold from the balance (step 474). If the wager amount is greater than the available amount, an appropriate error message is displayed to the player (steps 476 and 478), and the gaming device waits for another wager amount to be received (step 472). If the wager amount is not greater than the available amount, the gaming device allows initiation of play (step 480).

Figure 13:
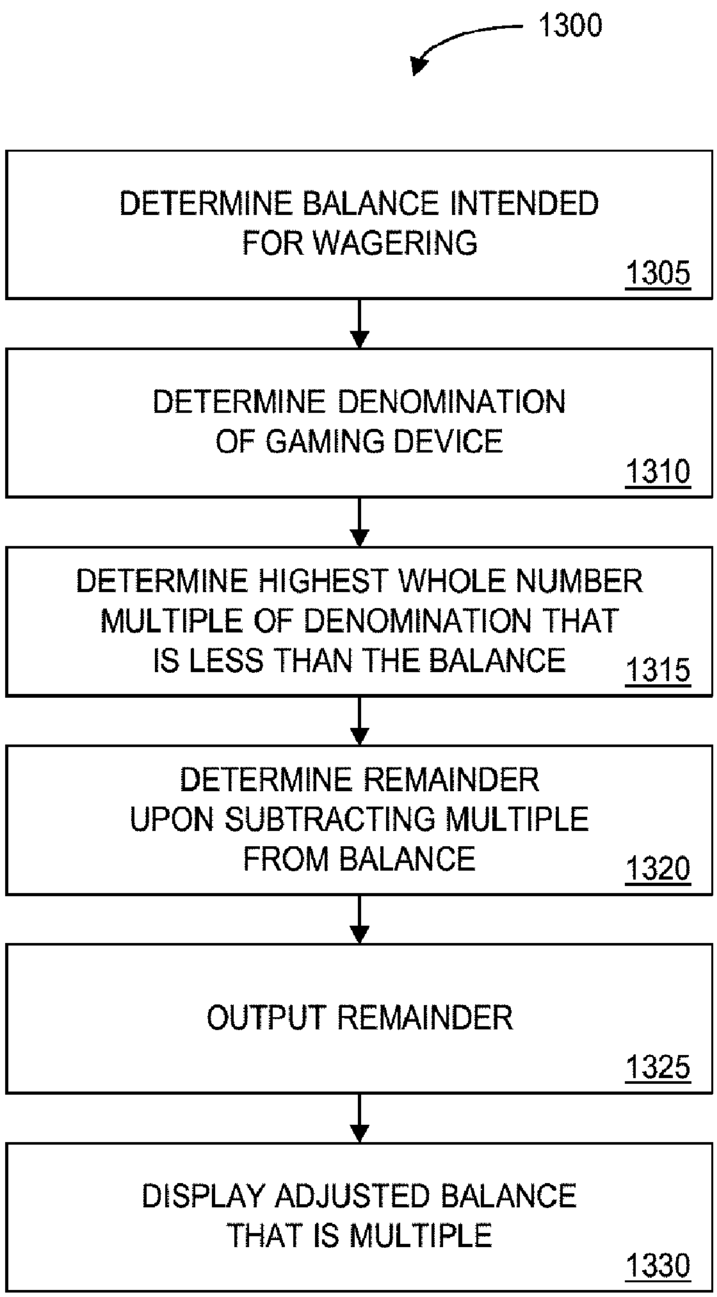
FIG. 13 is a flow chart illustrating an example process for outputting a portion of a balance of a gaming device, in accordance with an embodiment described herein.

Referring to FIG. 13, a process 1300 includes determining a balance intended for wagering (step 1305). For example, a cashless gaming receipt or other method of payment may be received by a gaming device. The process further includes, in step 1310, determining a denomination of a gaming device (e.g., the gaming device at which the payment is received or a balance is established). For example, a gaming device may store in its memory the denomination associated with the gaming device. In another embodiment, another device (e.g., a server computer or other controller operative to communicate with the gaming device) may store an indication of a denomination associated with the gaming device at which the payment is received or balance is established. In step 1315, the highest whole number multiple of the denomination that is less than the balance is determined. For example, the maximum number of game plays that may be initiated with the balance may be determined. The remainder of the balance that is left once the highest whole number multiple is subtracted from the balance determined in step 1305 is then calculated (step 1320). This remainder is output in step 1325. For example, a cashless gaming receipt redeemable for the remainder may be caused to be printed by a printer mechanism associated with the gaming device at which the payment was established. In step 1330, the adjusted balance is displayed. The adjusted balance is the highest number multiple determined in step 1315 (since the remainder was dispensed from the balance and is no longer included in the balance). For example, the adjusted balance may be displayed via a credit meter balance of the gaming device at which payment was received.

Figure 14:
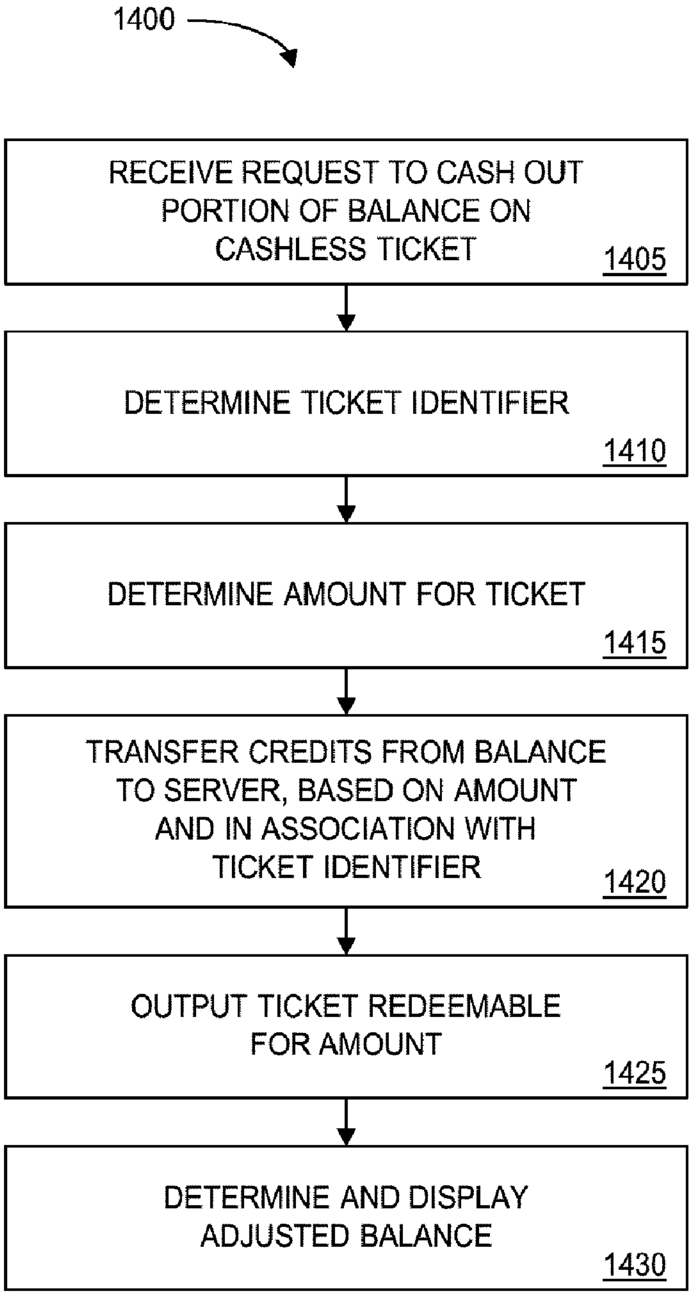
FIG. 14 is a flow chart illustrating another example process for outputting a portion of a balance of a gaming device, in accordance with an embodiment described herein.

Referring now to FIG. 14, a process 1400 includes receiving a request to cash out a portion of a balance on a cashless gaming receipt or cashless ticket (step 1405). In other words, a player may request that a portion of the credit meter balance be dispensed to the player in the form of a cashless gaming receipt that is redeemable for an amount of cash based on the portion. As described above, and illustrated via the remainder of the example process 1400, outputting a cashless gaming ticket may comprise transferring electronic credits to an account on a casino server. For example, an account or record in a database may be opened for each cashless gaming receipt or cashless ticket output by a gaming device, and the amount of cash that the cashless ticket is redeemable for may be stored in the account or record, based on a transfer of electronic credits from a gaming device to the server upon output of the ticket.

In step 1410, a ticket identifier for the cashless gaming ticket is determined. For example, such an identifier may be retrieved from a database of previously generated unique ticket identifiers or may be generated in upon receiving the request to cash out the portion of the balance.

The amount for the cashless ticket is determined in step 1415. For example, the amount that the request defined for cash out may be determined. In one embodiment, if the request defines a portion in terms of a dollar amount but the balance is stored in terms of electronic credits, an algorithm may be applied to convert the requested dollar amount to the corresponding number of electronic credits, to determine how many credits need be subtracted from the credit meter balance in order to satisfy the request. The amount for the ticket, in one embodiment, may be determined in terms of a dollar amount for which the ticket may subsequently be redeemed. It should be understood that although the term dollar amount is used herein, if the embodiments described herein are practiced in a jurisdiction using a currency other than dollars, then the amount for the ticket may be determined in the appropriate currency rather than dollars.

In step 1420, an amount of credits or other form of currency is transferred from the gaming device at which the cash out request is received to a server device operable to communicate with the gaming device. For example, in one embodiment, a server device stored an indication of cashless tickets output via gaming devices and the respective amount that each ticket is redeemable for. Thus, the server device may effectively store an account of credits or other currency for each cashless ticket that is output. For example, such an account may be created or activated upon the generation of a ticket identifier or upon the output of a ticket. The credits of the credit meter balance that correspond to the portion of the balance that is defined by the cash out request received in step 1405 may be transferred from the gaming device to the server upon the output of the ticket. The credits may be transferred in association with the cashless ticket identifier. For example, the gaming device that is outputting the cashless ticket in response to the request to cash out a portion of the balance may transmit the ticket identifier along with the number of electronic credits being deducted from the credit meter balance as a result of the request. In one embodiment, rather than transferring an amount of credits, the gaming device may transfer an amount of another type of currency (e.g., a dollar amount) by first converting the number of credits being deducted from the credit meter balance to the appropriate type of currency (e.g., dollar amount) and transmitting an indication of the dollar amount along with the cashless ticket identifier.

In step 1425, the cashless ticket that is redeemable for the amount determined in step 1410 is output. For example, a printer mechanism associated with the gaming device at which the request to cash out a portion of the balance was received may be directed to print the cashless ticket. The cashless ticket may include an indication (e.g., in machine and human readable form) of the amount that the cashless ticket is redeemable for.

In step 1430, an adjusted balance is determined and displayed (e.g., via a credit meter balance of the gaming device). The adjusted balance is determined by subtracting the portion defined by the request received in step 1405 from the balance as it existed immediately prior to the request.

It should be noted that any and all of the processes described herein may be performed by any device described herein and any combination of devices described herein, as practicable.

Those skilled in the art will note that various substitutions may be made to those embodiments described herein without departing from the spirit and scope of the present invention, as illustrated by the exemplary embodiments below.

For example, although a slot machine has been described above, the present invention is equally applicable to other gaming devices, such as video poker machines and video blackjack machines.

In another example, a player desiring to provide a gratuity to casino personnel (e.g., a cocktail waitress) may provide such a gratuity in the form of payment for one or more game plays (e.g., spins or handle pulls) on a gaming device. For example, an instrument representative of one or more game plays executable on a gaming device may be obtained by the player (e.g., purchased in exchange for a portion of the player's balance at the slot machine). This instrument may comprise, for example, a cashless gaming receipt printed via a printer associated with the gaming device being played by the player. The player may provide such a cashless gaming receipt or other instrument to the cocktail waitress or other casino personnel as a gratuity of a yet undetermined amount. The gratuity amount may subsequently be determined based on the outcome of the one or more game plays, once the one or more game plays are executed on a gaming device (e.g. the gratuity amount may be equal to any winnings resulting from game play). The indication of the one or more game plays may comprise indicia readable by a gaming device (e.g., a bar code) as representing payment for one or more game plays on the gaming device. In one embodiment, such a practice may be referred to as the purchase of a "tip spin" by a player with a portion of his total available balance. An indication of the "tip spin" may be printed on a cashless gaming receipt, which may be subsequently provided as a gratuity.

In yet another example, the gaming device itself might output a visual or other indication that a portion of a total available balance has been output or otherwise provided. For example, a light on the machine might visually indicate that a "tip ticket" has been recently printed, which may prompt casino personnel to dedicate time and attention accordingly.

According to yet another example, a gratuity may be funded by the conversion of player "comp points" to cash. For example, a portion of a player's total available comp points (a total available balance) may be converted into a cash gratuity based on a cash value associated with the points. For example, if a player has 5,000 comp points with a cash value of $0.01 each, a player requesting a $1.00 "tip ticket" might be allowed to surrender 100 of his 5,000 comp points in exchange for the $1.00 "tip ticket", output by a gaming device.

In yet another example, tip tickets and/or gratuity vouchers may be issued by the gaming device and/or the casino as a comp. For example, a player meeting certain play criteria on a gaming device might be rewarded with the output of a tip ticket at the gaming device.

In yet another example, the portion of the total available balance requested by the player may be indicated directly to casino personnel by the gaming device. For example, a player may request a portion for a total available balance for use as a gratuity. The gaming device may then output a visual indication of a code authorizing the casino personnel to debit or charge an account associated with the player by the requested amount. For example, the authorization code may indicate a player tracking number associated with the player, which may include or reference information associated with a player financial account (e.g. a credit card account, dedicated gratuity account, etc.).

In yet another example of embodiments described herein, the portion of the total available balance requested by the player may be transmitted to an electronic account associated with a casino agent (e.g., rather than transmit funds to a second gaming device, funds are transmitted to an electronic account of a central server). In one or more such embodiments, a casino agent may provide an identifier or code associated with an electronic account belonging to the casino agent. For example, such an identifier or code (an alphanumeric code) may be input using a gaming device input device (e.g., touch-screen), such that once the identifier or code is received by the gaming device, such a portion of a total available balance requested may be transmitted to an electronic account of a central server. In other examples, a casino agent may provide such a code or identifier by inserting a player tracking card or smart card into a gaming device, providing a biometric identifier (e.g., fingerprint), and so on.

What is claimed is:

1. A method for operating a gaming device to provide a monetary output, comprising:
- causing at least one processor to determine a balance credited to a player of the gaming device;
- causing at least one processor to determine a dispensed amount that is less than the balance in accordance with a balance management rule designated by the player before a play of a game;
- causing the at least one processor to operate with an output device to dispense an amount of currency that is based on the dispensed amount; and
- causing the at least one processor to adjust the balance by the dispensed amount.

2. The method of claim 1, wherein the balance management rule specifies that the dispensed amount be a difference between the balance and a predetermined threshold.

3. The method of claim 2, wherein the predetermined threshold is an initial balance.

4. The method of claim 1, wherein the balance management rule specifies that the dispensed amount be a predetermined percentage of a difference between the balance and a predetermined threshold.

5. The method of claim 1, wherein the balance management rule specifies that the dispensed amount be a total amount of winnings for the play of the game.

6. The method of claim 1, wherein the balance management rule specifies that the dispensed amount be a percentage of a total amount of winnings for the play of the game.

7. A method for operating a gaming device to provide a monetary output, comprising:
- causing at least one processor to determine a balance credited to a player of the gaming device;
- causing the at least one processor to operate with a display device to display a plurality of selections, each of the plurality of selections associated with an amount of credits which is less than the balance;
- causing the at least one processor to operate with an input device to enable the player to pick one of the plurality of selections;
- causing the at least one processor to determine a dispensed amount that is less than the balance based on the selection picked by the player;
- causing the at least one processor to operate with an output device to dispense an amount of currency that is based on the dispensed amount; and
- causing the at least one processor to adjust the balance by the dispensed amount.

* * * * *

UNITED STATES PATENT AND TRADEMARK OFFICE

CERTIFICATE OF CORRECTION

PATENT NO. : 7,905,775 B2
APPLICATION NO. : 10/908725
DATED : March 15, 2011
INVENTOR(S) : Walker et al.

It is certified that error appears in the above-identified patent and that said Letters Patent is hereby corrected as shown below:

In Claim 1, Column 16, Line 22, after "causing" insert --the--.

Signed and Sealed this
Fourteenth Day of June, 2011

David J. Kappos
*Director of the United States Patent and Trademark Office*